United States Patent [19]

Yasar et al.

[11] Patent Number: 5,105,529
[45] Date of Patent: Apr. 21, 1992

[54] PROCESS FOR AIRBORNE MONOLITHIC FERRITE RECORDING HEAD WITH GLASS-PROTECTED SELF-ALIGNED, MACHINED TRACK

[75] Inventors: Tugrul Yasar, Woodstock; Robert T. Sturrock, St. Remy; Harry P. Harnischfeger, Stone Ridge, all of N.Y.

[73] Assignee: National Micronetics, Inc., Kingston, N.Y.

[21] Appl. No.: 696,723

[22] Filed: May 7, 1991

Related U.S. Application Data

[62] Division of Ser. No. 258,591, Oct. 17, 1991.

[51] Int. Cl.$^5$ ................................................ G11B 5/42
[52] U.S. Cl. ...................... 29/603; 360/103; 360/122
[58] Field of Search .............. 29/603; 360/102, 103, 360/104, 105, 122, 125, 127

[56] References Cited

U.S. PATENT DOCUMENTS 4,837,922 6/1989 Toriu .................................. 29/603

*Primary Examiner*—Carl E. Hall
*Attorney, Agent, or Firm*—Hopgood, Calimafde, Kalil, Blaustein & Judlowe

[57] ABSTRACT

The present process is for the manufacture of a monolithic read/write recording head for use in disk drives. The airborne slider body and the transducer nose portion of the head is made from the same magnetic ferrite material. The magnetic material preferably consists of NiZn ferrite or MnZn ferrite. A narrow track ridge has a non-magnetic gap interposed across the track at some distance atop the I-bar coil assembly, between the slider and the transducer portion. The instant process provides a self-aligned track ridge across the gap by virtue of machining the ridge in one bonded piece.

For protection, this narrow gap and track ridge portion is glass encapsulated. Another embodiment of the instant process provides for a slider body equipped with both a servotype and data recording transducer assembly.

The process provides attachment on a spring-loaded head holder in such a position that the spring axis is in parallel with the long dimension of the body along its air bearing surface. Alternatively, the head can have mounting blocks arranged such that the spring axis is directed perpendicularly to the long dimension of the body.

9 Claims, 6 Drawing Sheets

FIG. 13A.
FIG. 12A.
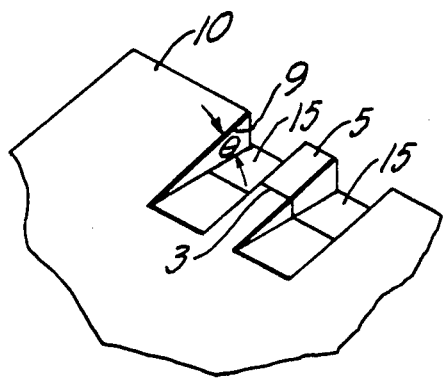
FIG. 13B.
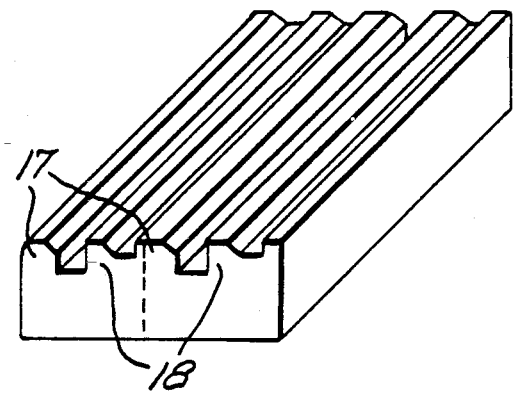
FIG. 12B.
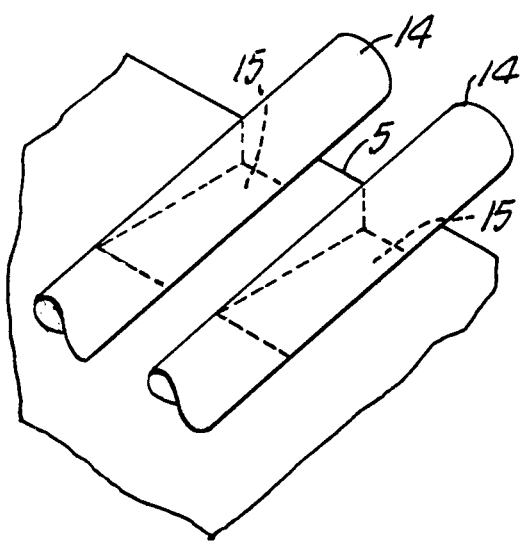
FIG. 13C.
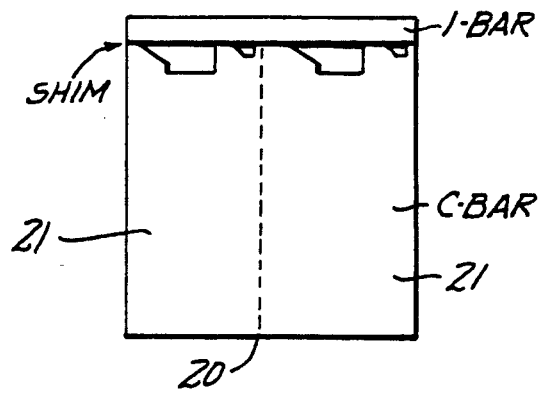

PROCESS FOR AIRBORNE MONOLITHIC FERRITE RECORDING HEAD WITH GLASS-PROTECTED SELF-ALIGNED, MACHINED TRACK

CROSS REFERENCE TO RELATED APPLICATIONS

This application is a divisional application of Ser. No. 258,591 filed Oct. 17, 1988.

BACKGROUND OF THE INVENTION

This invention describes a magnetic read-write head used in disk drives.

The technological advance of the digital recording and storage of information has produced a concomitantly rising need for greater capacity, speed and precision in the disk drive equipment used for this purpose.

For a review of the magnetic recording technology, the reader is directed to the following references, among others: Robert M. White, Editor, "Introduction to Magnetic Recording:, IEEE Press, New York, 1985, P. 51; W. A. Gross, "Fluid Film Lubrication", Wiley Interscience, New York, 1980; and C. Dennie Mee and E. D. Daniel, Editors, "Magnetic Recording, Vol. I - Technology", McGraw-Hill, New York, 1987, Chapter 7.

The critical component in a digital recording system is represented by the recording head which is usually held in a spring-loaded holder and placed onto the disk surface.

During the operation of a disk drive, as the disk rotates, the recording head is airborne and maintains a small spacing between itself and the disk surface. In the disk drive art, this is referred to as the head "flying" above the disk. The spacing is in the order of 6-12 microinches (0.15-0.3 micrometers). The recording head is assembled onto a spring and is loaded against the disk surface with a force provided by the spring. As the disk rotates, a self-acting hydrodynamic air bearing or cushion is formed between the air bearing surfaces and the disk surface. This air bearing provides the pressure against the force of the spring to maintain a constant separation between the head and the disk.

As is well known in the art of rigid disk recording technology, the flying height of the head above the disk is a function of many variables. Two are among the most important, namely, width of the air bearing surfaces and the relative velocity between the air bearing surfaces.

At present, there are three widely used, basic kinds of recording heads in the field of magnetic digital recording. These are ferrite monolithic heads, composite heads and thin film heads. Both the monolithic and composite heads utilize ferrite materials in their magnetic read-write structures and are therefore the main concern of this disclosure.

In the monolithic head, as the name implies, the read-write transducer as well as the body of the device, are formed together from the same piece of ferrite. The composite head, on the other hand, is a composite structure which consists of a transducer made from ferrite and a body made from a non-magnetic, usually ceramic material. The ferrite transducer and the ceramic body are manufactured separately and then are assembled and bonded together to form a composite structure.

Both heads have their distinct advantages and disadvantages when compared to each other. The greatest advantage of the monolithic recording head is its obvious ease of mass manufacturability with a resulting lower cost. The composite head, on the other hand, which involves assembling and bonding of at least two separate parts, is more difficult and costly to manufacture. The construction of composite heads requires machining, grinding, lapping and handling of very small and delicate ferrite cores. The small core portion for a composite head has to be precisely positioned in relation to the ceramic body and bonded to it by glass flow. Handling delicate and fragile parts and precisely positioning same for head assembly can be an expensive process.

The bonding of the two parts is usually done by glass bonding. Glass bonding technology is widely accepted and used in recording head technology as a clean and dependable method for permanently and precisely bonding two parts together. However, melting glass requires high temperatures. In the case of composite heads, this glass bonding operation is also the source of some further disadvantages. The operation, e.g., requires precision jigs which must endure the high glass bonding temperatures.

Moreover, the ferrite core must be embedded and bonded to the non-ferrite base such that the resulting head structure will be free of stresses and remain physically durable. As is well known in the field, magnetic materials such as ferrite, do suffer degradation of their magnetic properties when put under stress from temperature and other changes. For example, saturation magnetization of the ferrite core can be degraded by stress through a phenomenon known as magnetostriction. Therefore, the glass chosen for bonding the composite heads must have thermal expansion and contraction coefficients closely matched to that of the ferrite core and the ceramic body. The thermal expansion and contraction properties of the ceramic slider body must also closely match that of the ferrite core. These constraints seriously limit the choice of glasses for bonding ferrite cores into ceramic bodies to make composite sliders. Glass which may be suitable from a thermal expansion point of view is often found to be lacking in chemical and environmental stability. But the monolithic heads, not needing a bonding of the type described, are free of such problems.

There is a constant requirement to increase the density of stored information on a disk surface. This is accomplished by increasing the number of circular tracks on the disk surface and the bits stored in each track. This is commonly referred to as increasing the TPI, tracks per inch along a radius, and increasing the BPI, bits per inch of track, respectively. The requirement to increase the TPI is satisfied by making the read-write portion of the magnetic transducer, commonly referred to as track width, narrower.

Composite heads have the advantage over monolithic heads in this area because they can be made with durable narrow track widths. The machining of the composite ferrite cores with a narrow track width is not an easy task, but once they are securely embedded in glass, they remain protected and durable in use. Therefore, composite heads provide the disk drive industry with the desirable narrow track capability. However, the means by which the composite heads with narrow tracks are achieved are costly and require dissimilar materials.

The monolithic heads can also be made with narrow tracks but the resulting structure has an exposed, unprotected tracking ridge extending the entire length of the slider body. This narrow section of the head, including the read-write gap, is vulnerable to physical damage. Chipping of the narrow track edges results in a diminished read-write performance. The chipped ridge also gives unpredictable "flying" characteristics by changing the airflow pattern. It can be concluded, therefore, that the monolithic recording heads presently do not provide very narrow track widths together with reliability and durability.

For high density digital disk storage, another advantage of composite heads is obtained by placing the transducer at the end of an air bearing surface rather than at the middle of the trailing edge of the slider. This feature enables the device to record still more information on a given disk surface. This important advantage cannot be obtained from monolithic heads as presently known.

SUMMARY OF THE INVENTION

Accordingly, it is the general object of the invention described here to overcome the inherent shortcomings of fragile tracks in the monolithic heads and to provide the advantages of the composite heads without their use of dissimilar materials.

Another object of the present invention is to provide a new recording head which eliminates the fragile long and narrow center track of a monolithic head and further places the transducer at any location along the trailing edge or nose of the slider body.

It is still another object of the present invention to have a non-magnetic gap at the bonded junction between the I-bar and the slider body trailing edge.

It is a further object of the invention to preserve the advantage of low cost and easy mass manufacturability of monolithic head technology.

In this context, it is an object of the present invention to machine the narrow track only across the transducer nose and the slider body trailing edge of the recording head after assembling and bonding the transducer I-bar to a slider body.

It is also the object of the present invention to eliminate the durability problem of a narrow track transducer by protecting the narrow track with a glass cover or shroud.

Moreover, it is the object of this invention to provide the choice of glass which is not limited by criteria necessary for matching both the ferrite core and the ceramic body as in the case of composite heads. In this novel device, the glass has only to match the ferrite. It has been discovered that a significant advantage of the invention comes from the fact that the protective glass is applied to the narrow tracks immediately after machining the tracking gap portion.

It is thus the design of the present invention to also eliminate extensive handling of delicate parts. Therefore, it has been found that precise assembly operations, as in the case of composites, are diminished or eliminated altogether because the inventive design is basically a monolithic structure.

BRIEF DESCRIPTION OF THE DRAWINGS

The invention will be better understood in view of the following description of the presently preferred embodiments thereof with reference to the appended drawings in which:

FIG. 12A is a closeup view of the track after track grinding operations;

FIG. 12B is an illustration of the placement of glass rods or pieces on track grooves before the glass is melted and flowed around the track to protect it.

FIG. 13A is a perspective diagram of a I-bar blank block before joining to the C-bar block.

FIG. 13B is a perspective diagram of a C-bar block showing apex and butt grooves; and FIG. 13C is a diagram of the bar assembly before bonding and cutting into halves.

The same numerals are used throughout the figures of the drawings to designate the same or similar parts.

DESCRIPTION OF THE INVENTION

Figure 1:
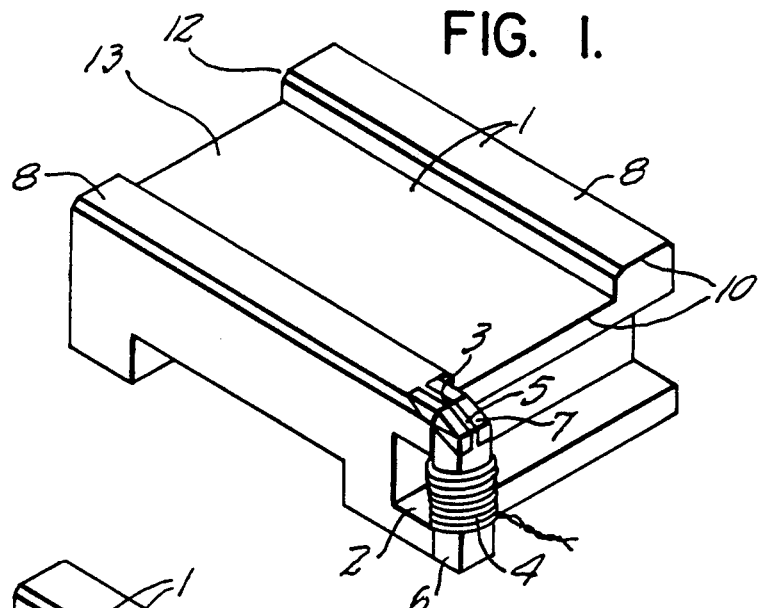
FIG. 1 is an isometric drawing of the present invention.

Reference should now be made to the drawings where in a read-write head embodying the present invention designated generally by the reference numeral 1, is shown as consisting of a slider body with two side rails which function as air bearing surfaces 8.

In one preferred embodiment, referring to FIG. 1, a transducer 2 is bonded with a thin layer of glass to one end of a side rail 8. The transducer is a magnetic I-bar 6 and coil 4 assembly which is machined at the top into the shape of a narrow track 5. A gap 3 is interposed at a right angle to the direction of the narrow top track 5. Both sides of the narrow track 5 as well as the tracking gap 3 where the I-bar 6 is joined to the body by the thin bonding layer of glass are embedded for protection with a molten glass cover 7. The body 1 and the transducer portion 2 are made from a magnetic material such as NiZn ferrite or MnZn ferrite, forming a magnetic circuit with a magnetic flux flowing through the nonmagnetic gap 3.

The coil 4 which is wrapped around the ferrite I-bar 6 generates a magnetic flux when excited with a write current. The magnetic flux is controlled by the magnetic circuit such that it crosses the gap 3. In this manner, part of the magnetic flux emanating from the gap 3 writes a bit of information on a magnetic disk surface. The theory of operation of magnetic recording heads and disk drives of course, is well-known to those familiar with the field.

Figure 2:
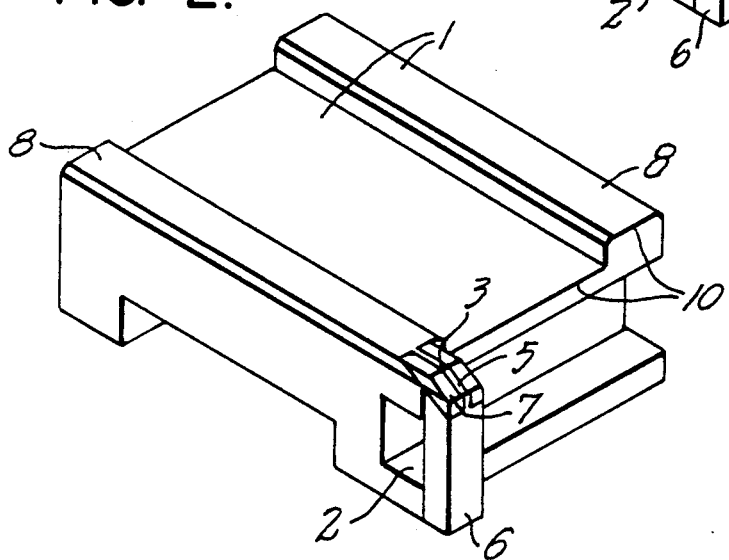
FIG. 2 is the same isometric drawing of the present invention where the coil windings have been intentionally left out to give a better view of the structure.

Referring to FIG. 2, the coil winding is intentionally left out in order to show certain details of the present inventive embodiment. The track 5 is the narrow cross section which is formed by machining and grinding of the ferrite I-bar 6 and the body 1 of the slider or head as one bonded assembly.

In one preferred example, the track width can be about 300 microinches ($300 \times 10^{-6}$ inches) for a very high TPI disk drive. The functional read-write gap 3 is located in this track 5 which is surrounded and physically shielded by glass 7, with reference to FIG. 3.

Figure 4A:
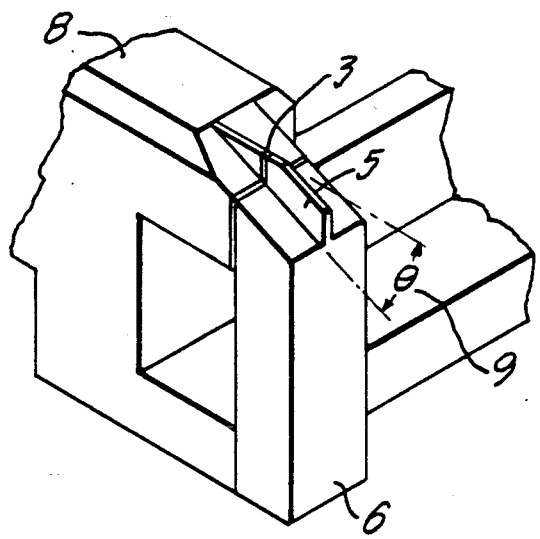
FIG. 4A is a perspective view of the transducer part of the recording head without windings; this figure shows the narrow track of the transducer without the protective glass.
Figure 4B:
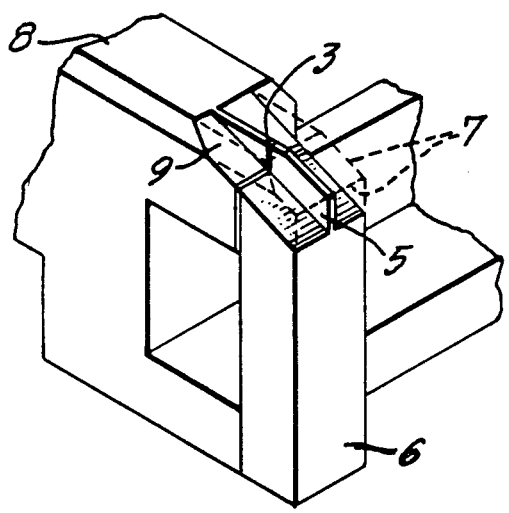
FIG. 4B is a view of the protection of the narrow track with glass.

Referring to FIG. 4A, the track is shown without the protective glass cover 7, while in FIG. 4B the shape of the space is covered by the glass material 7 as outlined.

The feature which allows this invention to have a monolithic structure is the way the track width is shaped.

More clearly, the narrow track 5 is not ground as in the old art at the same continuous top level as part of the rail 8. Instead, this new design provides that the sides of the tracking ridge are created by machining a planar surface 15 at an angle, 0 (theta), which joins the rail 8 at location 9A.

As seen in FIG. 1 and FIG. 12A, the cutting grooves or planar surfaces 15 extend across the gap 3 from one nose end at the top of the I-bar 6 to a point in the adjacent level of the side rail of the body, near the gap 3.

As illustrated diagrammatically in FIGS. 12A and 12B as well as FIG. 4A and 4B, the angle at location numeral 9 between the inclined planar surface 15 and the top surface of rail 8 or tracking ridge 5 determines how deep the track groove 15 will be, as well as how long the glass area 7 protecting the track will extend. A larger angle at 9, such as $\theta = 30°$, will result in a more deeply cut track 15.

Figure 11:
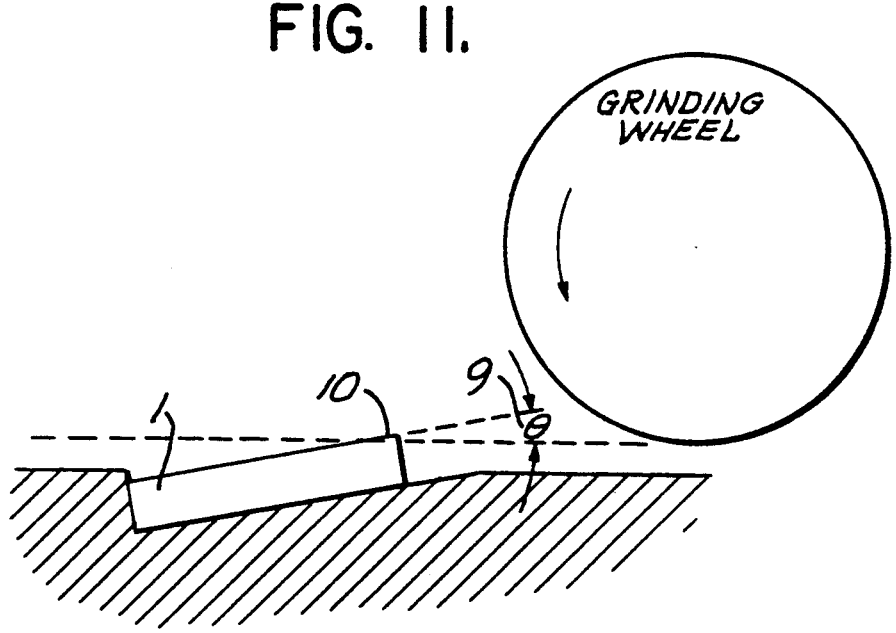
FIG. 11 is an illustration of how the track is cut at an angle 0.

The track is formed by grinding the trailing edge of the head 10 at an angle. This angle, $\theta$, can be 10°, 20°, 30°, or 40° for example. Referring to FIG. 11, the grinding wheel is operated at the angle, $\theta$, into the trailing edge 10.

It would be understood by one familiar with the field that the deep grinding of a more than 20° cut will result in a side wall angle for a desirably narrow track ridge 5 which is close to the ideal vertical 90°. This is so because the grinding wheel cuts a steep angle if it makes a deep cut. A shallow cut with angle $\theta$ being equal to 10°, on the other hand, is likely to result in a track with more tapered side walls because the grinding wheel sides usually wear down during the grinding process while in continuous manufacturing use. It should also be noted, however, that shallow angle cuts may result in sturdier tracks. Therefore, the actual value of angle, $\theta$, finally used is a compromise based on manufacturing ease and yields. The preferred angle, $\theta$, ranges from about 20° to 40°, the most preferred angle, $\theta$, being at about 30°.

The method which is used to obtain this angle, $\theta$, at location 9 is depicted in FIG. 11. The diagram in FIG. 12A moreover shows the track width 5 and track grooves 15 before they are embedded in molten glass.

A drawback in using heads having narrow tracking surfaces derives from the fact that the edges are very fragile unless they are protected with a glass cover.

Figure 3:
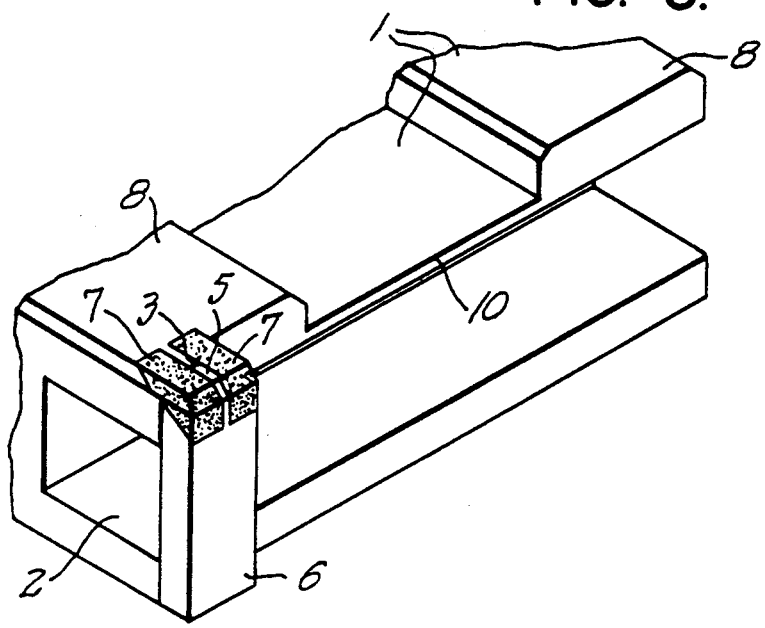
FIG. 3 is an enlarged view of the trailing edge of the head; the windings have been intentionally not drawn into the design to simplify the picture.

Referring to FIG. 12B, in one preferred embodiment the protective glass cover is provided by placing glass rods 14 in the grooves 15 cut on both sides of the track 5. The glass-head assembly is then heated in a kiln with a peak temperature of 500°-550° C. for the purpose of melting and flowing the glass around the tracking sides. The excess glass flow in the track grooves 15 and around the track 5 is later ground and lapped so that smooth and precisely contoured surfaces 7, as shown in FIG. 3, are obtained.

There are many possible kinds of glass which can be used for this purpose. The suitable glass must have thermal expansion and contraction coefficients close to that of the ferrite used for head construction, and it must be chemically and environmentally stable and durable. Of course, it will be clear to one familiar with the field that the firing and melting temperatures of the glass must be low enough to not cause destruction or distortion of the parts under construction.

In a preferred example, a lead boro-silicate glass is used having a composition, by weight, of $SiO_2$, about 5-15%, $Al_2O_3$, about 5-15%, $B_2O_3$, about 5-15%, and PbO, about 65-75%, providing a "softening" point ranging from about 400° to about 450° C. Preferably, the glass composition has a coefficient of expansion of $90-100 \times 10^{-7}$ per degree C.

As will be obvious to the person experienced in this art, all of the operations described here and also other operations involved in shaping and finishing the construction of the heads, can be performed on a single bar or block at the same time from which a large number of heads can be cut, finally resulting in considerable economic advantages through mass production.

In one preferred method, the manufacture of the monolithic read/write recording head begins with the machining of the two major precursor parts, the I-bar and the C-bar (see FIGS. 13A and 13B). The C-bar of FIG. 13A makes up the main slider body while the I-bar of FIG. 13B is on the "nose" portion of the complete head piece providing the transducer portion.

The starting material consists of ferrite pucks which are cut and sliced into suitable blanks. These blanks are then shaped by machining into the appropriate contours to provide C-and I-bars (FIG. 13a and b). The gap surfaces where the C- and I-bars are joined and bonded are first ground and polished. Prior to assembly, the C-bar is also furnished with shims which are layered onto the polished surfaces by mask-controlled vacuum evaporation of suitable materials preferably consisting of silicon monoxides, or, alternatively, by "sputtering" an appropriately thin glass layer onto these surfaces. The thickness of these shims (or glass layers) determines the extent of the gap spacing. The I-bar precursor plate is mated to the apex 17 and butt 18 areas of the C-bar precursor surface, as shown in FIG. 13c. After this assembly step, glass rods are inserted into both the apex 17 and the butt 18 gaps (see FIG. 13c). For the purpose of bonding, the C- and I-bar precursor assembly is processed through a kiln which is adjusted to a suitable temperature and atmosphere in order to melt the glass rods. While providing a strong bond between the individual components, the molten glass concomitantly also fills the non-magnetic tracking gap.

As shown in FIG. 13C, the bonded bars or I- and C-bar assemblies are then cut laterally in half 20 to produce two identical bonded bar (or head) pieces. Additional processing is applied to these bonded bar pieces to form notches 13, chamfers 12 and preliminary dimensions as appropriate for the slider body 1 (see FIG. 1). Subsequently, the gap width 3 and the narrow tracking ridge 5 are formed by grinding the top surface of the head piece nose portion with planar surfaces on both sides of the top surface track across the bonded junction between I- and C-bars, the planar surfaces declining from the trailing edge 10 of the adjacent rail end and forming a suitably large angle, $\theta$, at 9 with the narrow top surface of the track 5, and grinding the narrow track surface at a suitable distance from the trailing edge 10 of the body 1 to obtain a narrow surface 5 which is declining at an angle similar or parallel to angle, $\theta$, of 9 as shown in FIG. 11 (see also FIG. 1 or FIG. 3). After thorough cleansing of the surface, low temperature melting glass pieces 14 are placed on both sides of the gap and track width 5 as indicated in FIG. 12B, and melted again in a kiln in order to embed the gap width in a protective layer of molten glass.

The slider body 1 is now machined to further define the glass-embedded trailing edge 10 or nose portion 2 of the slider 1, according to the shape shown, e.g., in FIG. 3. In order to facilitate further processing, the clean individual halves of the bonded bar-assembly are mounted onto ferrite handling blocks and subsequently locked into a matrix format. The matrices of bonded-bar halves are transformed by machine into individual sliders. These steps include forming the ABS (air bearing surface) trough, dicing of the bars into individual sliders and defining the rail chamfers and ABS width.

In the dicing step, the relatively crude slider body precursor is preferably sliced from the bonded I- and C-bar arrangement such that the bonded bar portions decorated with shims are cut out and thus leave only the glass bonded (shimless) portions for further processing.

Finally, diamond polishing is used to give the slider its final characteristic dimensions while creating a flat, high gloss air bearing surface. After removal from the mounting blocks, the sliders 1 are selected for coil 4 winding around the transducer I-bar 6 in the nose portion 2.

The persons familiar with recording heads and their manufacturing technology can easily see that the transducer 2 does not have to be situated at the end of the air bearing surface 8. The transducer 2 can also be situated at any point along the trailing edge 10 of the head.

Figure 5:
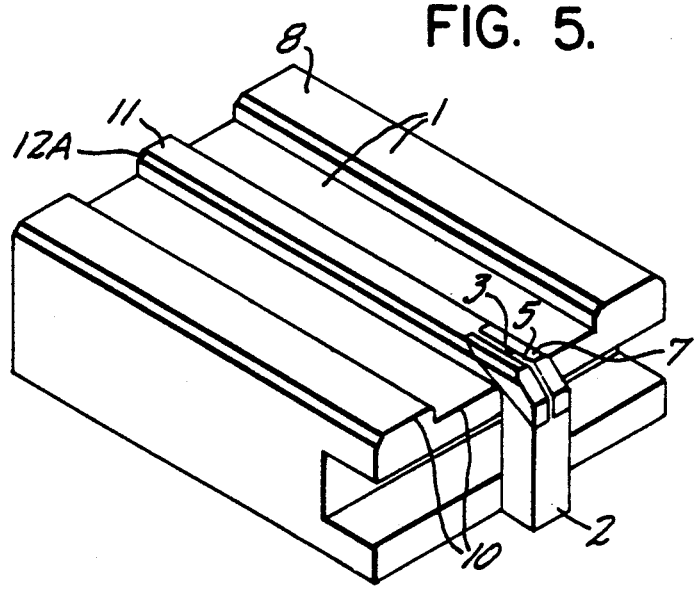
FIG. 5 is the isometric drawing of another embodiment of the present invention where the transducer is placed in the center of the trailing edge of the recording head.

Referring to an example, in FIG. 5, which shows the transducer placed at the center of the trailing edge 10 of the recording head 1. In this specific embodiment of the invention, for ease of machining the transducer 2, a rail 11 is machined lengthwise into the middle portion of the head. This rail 11 is advantageously wide enough to machine it without incurring any significant yield losses due to chipping. The bevels 12A along both sides of this rail 11 help prevent chipping of the corners. The narrow track 5 of transducer 2 is formed at the trailing edge 10 of this rail, in the same manner as described before.

The width of the rail 11 can be, for example, as narrow as 0.003 inch. Depending upon its chosen width, the middle rail 11 might also provide an air bearing surface. Any effect of this additional air bearing surface area on the flying height of the recording head can be compensated by decreasing the widths of the other two air bearing surfaces 8 on the sides of the slider body. According to a preferred embodiment, this additional rail can be made to have a more substantial width, e.g. 0.008 inch, such that its air bearing effect would also improve and stabilize the flying dynamics of the recording head.

Figure 10:
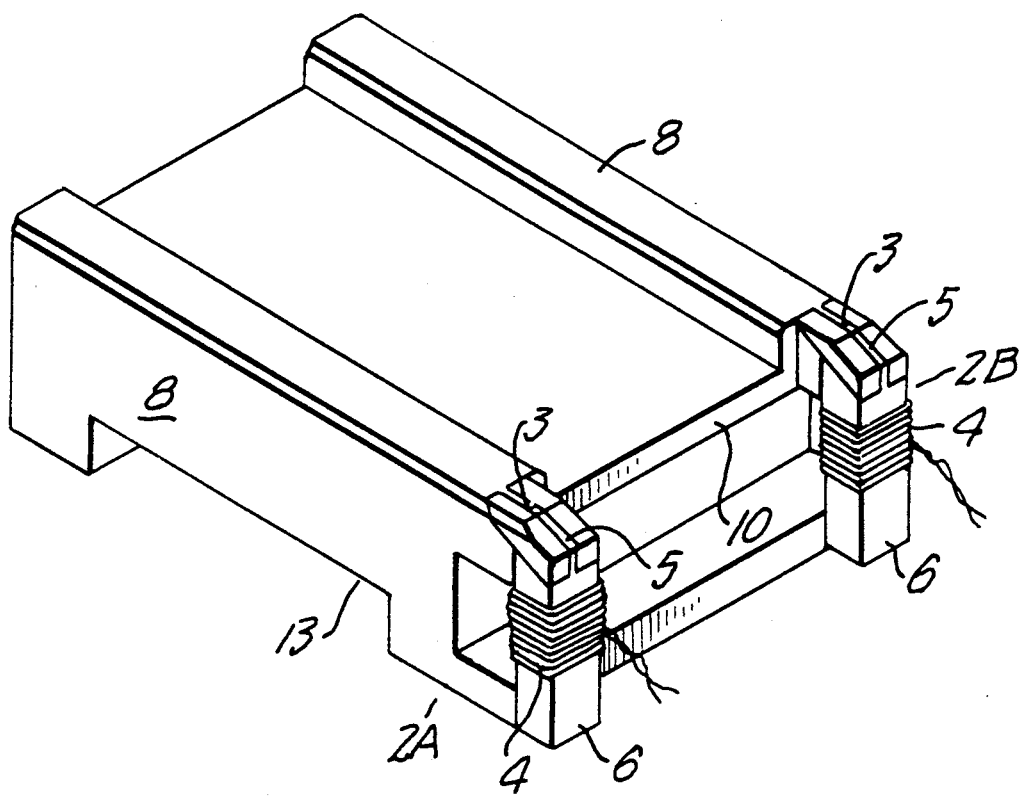
FIG. 10 is a diagrammatic view of another embodiment of the present invention displaying two transducers; there is a transducer at each end of the air bearing surface.

The diagram for another embodiment of the invention can be seen in FIG. 10. In this preferred embodiment, there are two active transducers, 2A and 2B, in the structure. Each transducer, 2A and 2B, is shown at the end of each of the air bearing surfaces 8. All of these transducers can be data read-write transducers. The purpose and the usefulness of multiple read-write transducers is to access two or more tracks simultaneously or consecutively in time without moving the head-holder assembly 16 between tracks. In certain designs of disk drive systems, this feature would provide an advantage by decreasing the search and access times to data residing on two or more tracks. The number of transducers per head does not have to be limited to two. Limitation would be conceivably the space available for multiple transducers 2 which are located at the trailing edge 10 of the head.

The invention described here has several advantages over composite heads when multiple read-write transducers per head are constructed. According to the present invention, the transducers 2 are machined from the same piece of ferrite, as opposed to assembling and bonding transducers to a ceramic body in the case of the construction of composite heads. Therefore, the cost of repeating possibly automated machining or grinding operation to form the second or third transducer from the same body may not be significantly higher than that of merely machining a single transducer head. In addition, the production yields of the integrated device as described here can be predicted to be higher than that of a composite head with the resultant benefit that the invention with multiple transducers would be more economical and simple to build than its competing composite head version having similarly high TPI capacity.

Moreover, taking reference to the embodiment of the invention shown in FIG. 10 there can be more than one transducer 2 on the recording head. In this sample, there are two active transducers, 2A and 2B, in the structure. Each transducer, 2A and 2B, is shown at the end of each of the air bearing surfaces 8. These transducers can be all data read- write transducers.

Figure 7:
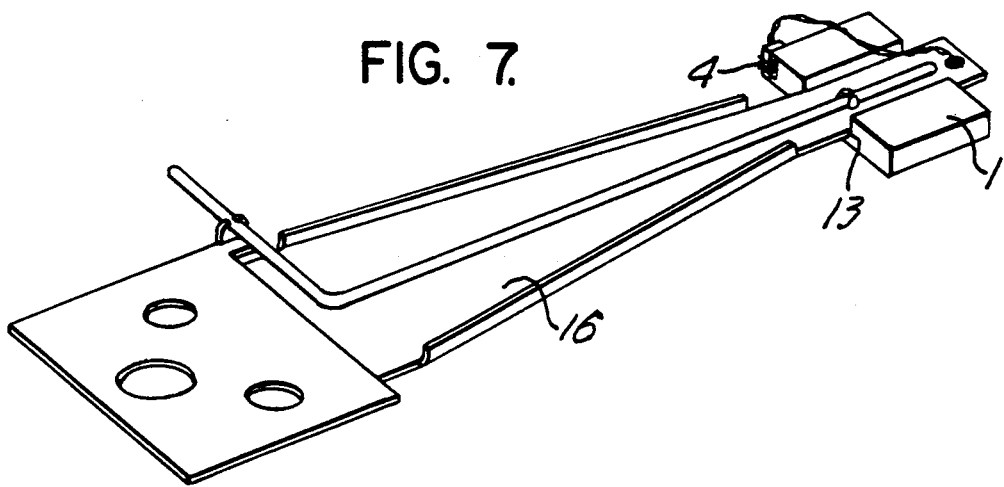
FIG. 7 is a drawing of the spring-head assembly of the recording head shown in FIG. 6A and 6B; the long axis of the spring is perpendicular to the long dimension of the head.
Figure 9:
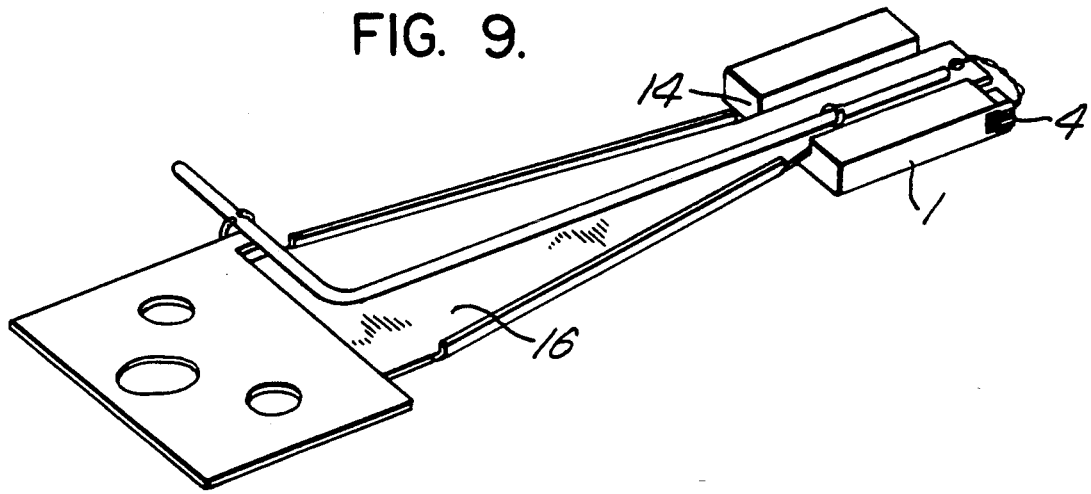
FIG. 9 is the drawing of the spring-head assembly of the head shown in FIG. 8A and 8B; the long axis of the spring and long axis of the recording head have the same directional orientation.

One of the transducers 2 in a multiple transducer head can conceivably be a servo head and others, data read-write transducers. As it is well known in the disk drive industry, disks carrying a large number of tracks per radial inch of recording surface (high TPI) require a dedicated servo surface and a dedicated servo head. The disk drive thereby finds the correct tracks on which to read or write the data by means of this dedicated servo surface and its head. As shown in FIGS. 7 and 9, all heads 1 and their springs 16 are assembled on spring loaded holder arms which are further arranged in a stack formation. In such a stack, for example, there is one servo head and a multitude of data heads. The servo head, by reading the servo information which has been previously and permanently written on the servo surface, thus leads the stack (all other data heads) to the track which the disk drive is programmed to access.

This preferred arrangement provides the additional advantage that the dedicated servo surface is not detailed as a single separate surface on the disk but is distributed among the data surfaces to give greatest possible performance advantage to the disk drive system designer. By distributing the servo tracks or the servo band of tracks in the practice of this special embodiment of the present invention, some of the tight mechanical tolerances associated with the stack-type disk drive assembly can be relaxed. On the other hand, if necessary, even tighter tolerances, with correspondingly increased data capacity, can also be advantageously achieved for such disk drives.

Figure 6A:
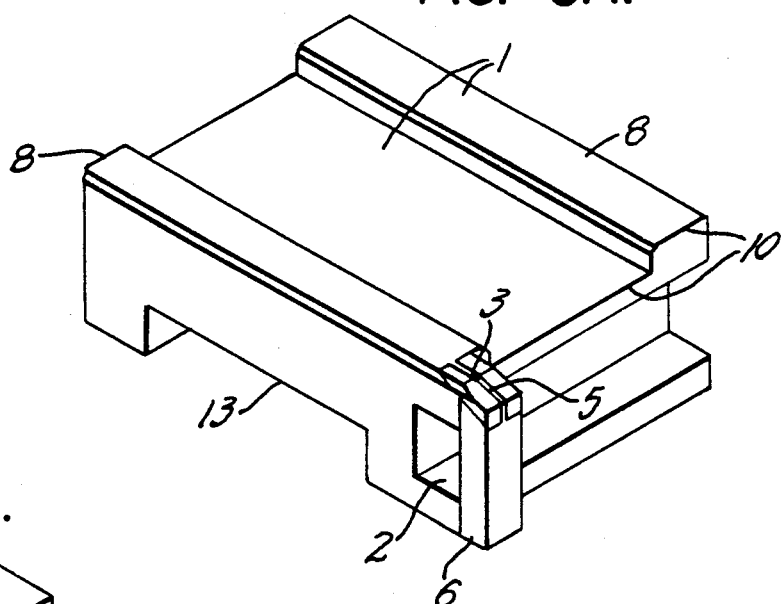
FIG. 6A and 6B are isometric drawings of the present invention where the notch at the backside is oriented perpendicularly to the long dimension of the recording head.
Figure 6B:
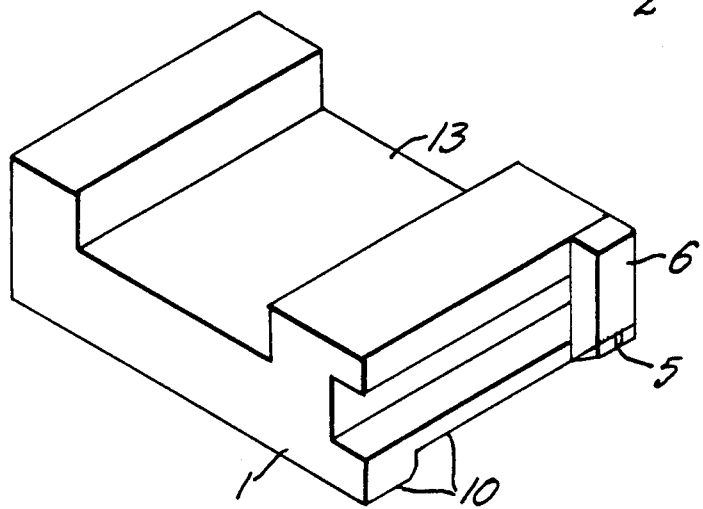

Referring to FIG. 7, the read-write head 1 is attached to the spring 16 (or gimbal) using an adhesive such as epoxy or cyanoacrylate. The bonding point between the torsion spring and the head is at the backside 13 of the head as illustrated in FIG. 7 and FIG. 6B. The notch 13 at the backside of the head in FIG. 6B is the area where the end of the spring is permanently bonded as shown in FIG. 7. In this particular configuration, the spring axis in the head holder is perpendicular to the longer dimension of the read-write head along the air bearing surface (see FIG. 6A).

Figure 8A:
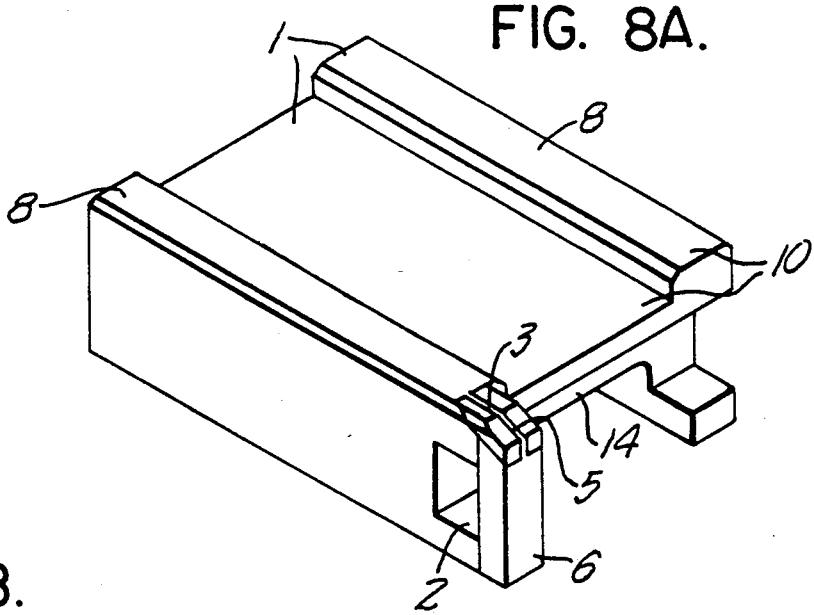
FIG. 8A and 8B are isometric drawings of another version of the present invention where the notch at the backside of the head is oriented parallel to the long dimension of the recording head.
Figure 8B:
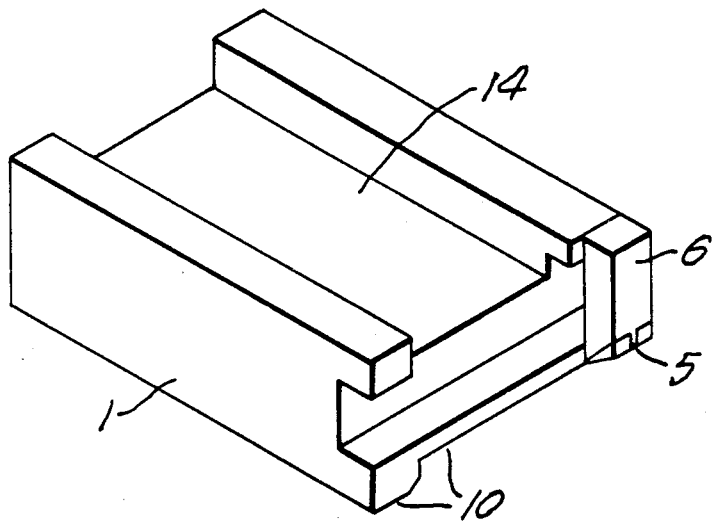

The recording read-write head 1, which is the subject of the present invention, can also be configured as shown in FIG. 8A and FIG. 8B. In this embodiment of the invention, the notch 13 on the backside of the read-write head 1 is parallel to the air bearing 8 surfaces (along the longer dimension of the head). In reference to the diagram of this embodiment a head-spring assembly provides a spring 16 which is mounted to the head such that the axis of the spring along its long dimension is in the same direction of the long axis of the head. This mounting arrangement (FIG. 8 and FIG. 9) is advantageous because it provides the manufacturer to use a rotary positioner in his disk drive and to gain advantages such as greater speed of access to data and reduced size of the required disk drive, especially in 3½ in. disk drives. The invention as described here can be made as an option in either embodiment type, thus allowing the disk drive manufacturer to choose a suitable embodiment for the various head-spring mounting techniques.

While the invention has been described with reference to the presently preferred embodiments thereof, it should be apparent to those skilled in the art that various modifications and changes in construction can be incorporated without departing from the true spirit of the invention as defined in the appended claims.

We claim:

1. A process for manufacturing a monolithic airborne read/write recording head for use in disk drives, which comprises forming the recording head from magnetic material comprising a slider body having as its top surface area chamfered bar rails directed from a leading edge of the slider body to a trailing edge of the slider body; the slider body on the bottom surface having two blocks on parallel sides for attaching to a suitable headholder, both side blocks being located in parallel either with the rail bars or with the leading and trailing edges of the slider body; and the slider body trailing edge being affixed to a nose portion comprising a transducer portion having a gap within a narrow track ridge protectively encapsulated in glass;

the forming of the recording head comprising the following steps:

(a) grinding and lapping the magnetic material separately into a block with a surface side of parallel contours and grooves for apex and butt portions of a C-bar component or slider body precursor; and a rectangular plate with a flat surface for an I-bar component or transducer nose portion precursor of the recording head;

(b) prior to assembling the two precursor components into a single bar body, polishing the surfaces of the apex and butt portions of the C-bar as well as the juxtaposed contact surfaces on the I-bar;

(c) layering ultra thin spacer shims by vacuum evaporation or sputtering glass of the appropriate thickness onto the gap surfaces of the C-bar;

(d) bonding the I-bar component to the apex and butt portions of the C-bar comprising assembling I- and C-bars, inserting glass rods into grooves at the apex and the butt, and melting the glass at a sufficiently high temperature;

(e) cutting the bonded bar-assembly into two or more identical head pieces;

(f) shaping each head piece with appropriate notches, chamfers, and dimensions;

(g) grinding the top surface of the head piece nose portion to form a narrow track ridge across the gap between the I-bar and C-bar portions having planar surfaces at both sides of the track ridge and adjacent to its vertical sides, the planar surfaces declining from the trailing edge of the slider body portion toward the trailing edge of the transducer I-bar forming an angle, 0, (theta) with respect to the top surface of the track ridge;

(h) embedding the track ridge and gap portion of the head piece in molten glass;

(i) grinding and lapping the track ridge and gap portion and the surface of the surrounding glass into a shape commensurate with the contours and dimensions of the transducer nose portion wherein the surfaces are coplanar with the adjacent air bearing surface and with the vertical sides surfaces of the I-bar;

(j) shaping and dicing the bars into individual sliders;

(k) defining and polishing the rail chamfers and air bearing surfaces; and (l) winding a wire coil around the transducer I-bar for generating magnetic flux.

2. The process for manufacturing a monolithic read/write recording head according to claim 1, wherein the angle, $\theta$, ranges from 10° to 40°.

3. The process for manufacturing a monolithic read/write recording head according to claim 2, wherein the preferred angle, $\theta$, is about 30°.

4. A process for manufacturing a monolithic read/write recording head according to claim 1, wherein the magnetic material is selected from the group consisting of NiZn ferrite and MnZn ferrite.

5. The process for manufacturing a monolithic read/write recording head for disk drives, according to claim 1, wherein the glass material has a softening point in the range from about 400° to about 450° C.

6. The process for manufacturing a monolithic read/write recording head according to claim 5, wherein the glass material comprises a lead boro-silicate glass.

7. The process for manufacturing a monolithic read/write recording head according to claim 6, wherein the lead boro-silicate glass comprises, by weight, about 5%–15% $SiO_2$, 5%–15% $Al_2O_3$, 5%–15% $B_2O_3$, and 65%–75% PbO.

8. The process for manufacturing a monolithic read/write recording head according to claim 1, wherein the head comprises more than one transducer assembly.

9. A process for manufacturing a monolithic read/write recording head according to claim 8, wherein at least one transducer assembly serves to locate a disk track.

* * * * *